(12) United States Patent
Shichijo et al.

(10) Patent No.: US 6,300,412 B1
(45) Date of Patent: Oct. 9, 2001

(54) PROCESS FOR PREPARATION OF RUBBER-MODIFIED AROMATIC VINYL RESIN COMPOSITIONS

(75) Inventors: Yasuji Shichijo; Masanari Fujita, both of Kisaradu (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/462,356

(22) PCT Filed: Jul. 6, 1998

(86) PCT No.: PCT/JP98/03029

§ 371 Date: Jan. 7, 2000

§ 102(e) Date: Jan. 7, 2000

(87) PCT Pub. No.: WO99/02576

PCT Pub. Date: Jan. 21, 1999

(30) Foreign Application Priority Data

Jul. 7, 1997 (JP) .................................................... 9-181310

(51) Int. Cl.$^7$ ...................................................... C08L 25/10

(52) U.S. Cl. ................................ 525/70; 525/78; 525/80; 525/83; 525/84; 525/316

(58) Field of Search .............................. 525/70, 78, 80, 525/83, 84, 316

(56) References Cited

U.S. PATENT DOCUMENTS 3,991,136 * 11/1976 Dalton et al. ........................... 525/84
5,852,124   12/1998 Wang et al. .

FOREIGN PATENT DOCUMENTS 63-221147A   9/1988 (JP) .
6-25507A     2/1994 (JP) .
6-157863A    6/1994 (JP) .

* cited by examiner

Primary Examiner—Nathan M. Nutter
Assistant Examiner—Olga Asinovsky
(74) Attorney, Agent, or Firm—Birch Stewart Kolasch & Birch, LLP

(57) ABSTRACT

This invention relates to a process for preparing rubber-modified aromatic vinyl resin compositions by polymerizing a raw material solution containing 3 to 20% by weight of rubbery polymer, 50 to 97% by weight of an aromatic vinyl monomer, and 0 to 30% by weight of a solvent until the conversion of said aromatic vinyl monomer falls in the range from 30 to 70%, adding a (meth)acrylate monomer or its mixture with other monomers to the reaction mixture so that the ratio by weight of the aromatic vinyl monomer in the reaction mixture to the (meth)acrylate monomer becomes 85/15 to 50/50, continuing the polymerization, and devolatilizing to remove the unreacted monomers, solvent, and the like. It is possible by this process to prepare easily and economically rubber-modified aromatic vinyl resin compositions of easy processability, good surface properties in respect to appearance and scratch resistance, and good balance between impact resistance and rigidity.

8 Claims, No Drawings

PROCESS FOR PREPARATION OF RUBBER-MODIFIED AROMATIC VINYL RESIN COMPOSITIONS

This application is the national phase under 35 U.S.C. §371 of PCT International Application No. PCT/JP98/03029 which has an International filing date of Jul. 6, 1998, which designated the United States of America.

TECHNICAL FIELD

This invention relates to a process for preparing rubber-modified aromatic vinyl resin compositions composed of rubber-modified aromatic vinyl resins and aromatic vinyl resins containing styrenic units and (meth)acrylate units.

TECHNICAL BACKGROUND

Rubber-modified styrenic resins (HIPS) are used widely in the fields of electric appliances, electronic equipment, office automation equipment, communication equipment and the like on account of their inherent qualities such as good impact resistance and easy processability.

In recent years, a growing demand for recycling of articles molded from resins has generated an increasing tendency to omit the painting of the surface of molded articles and created a strong demand for improvement in surface properties such as appearance and scratch resistance.

However, HIPS resins derive their impact resistance from rubbery polymers dispersed as particles in the styrenic resin phase and it is these rubber particles that cause unevenness on the surface of a molded article to lower the surface gloss and scratch resistance. As a result, HIPS resins find a limited use in applications requiring good appearance and scratch resistance.

In view of this, remedial measures such as reducing the diameter of rubber particles and controlling the particle size distribution have been proposed to improve the appearance of HIPS.

However, these measures were unable to satisfactorily balance the impact resistance and rigidity against the appearance and, most decisively, the fundamental problem here was that they were unable to provide HIPS with sufficient scratch resistance.

Addition of lubricants such as organopolysiloxanes for enhancing surface slipperiness has been proposed as a means to improve scratch resistance. However, this approach is not necessarily sufficiently effective for making improvement in scratch resistance and, besides, the additives are liable to deteriorate the appearance and stain the mold.

Moreover, a method which comprises compounding ABS resins with a scratch-resistant material such as methacrylic resins is known as a means to improve simultaneously the impact resistance, appearance and scratch resistance. However, this technique involving the use of ABS suffers from marked deterioration of the processability compared with HIPS.

Japan Kokai Tokkyo Koho Hei 6-25,507 (1994) discloses rubber-modified styrenic resin compositions (rubber-reinforced methacrylate-styrene copolymer compositions) with excellent surface properties comprising rubbery polymers dispersed as particles in a continuous phase of copolymers of styrenic monomer and (meth)acrylate monomer.

However, a sufficient improvement of the surface properties, particularly the scratch resistance, by the aforementioned rubber-reinforced methacrylate-styrene copolymer compositions requires copolymerization of a large quantity of (meth)acrylate monomer and this, in turn, presents another problem of deterioration of the processability. Keeping the processability at a given level necessitates control of the glass transition temperature of the matrix phase and this, in turn, necessitates additional copolymerization of butyl acrylate or the like. However, the additional copolymerization of butyl acrylate will lower the heat resistance of molded articles with the resultant narrowing of the range of their practical use and also will raise the cost.

Japan Kokai Tokkyo Koho Hei 6-157,863 (1994) proposes a method for utilizing the aforementioned rubber-reinforced methacrylate-styrene copolymers and HIPS as a mixture of the specified ratio.

The method, however, is not sufficiently effective for improving the scratch resistance and enhances the rigidity with difficulty on account of the rubber being dispersed as particles also in the methacrylate-styrene copolymers.

As described above, it has been difficult to prepare materials of good processability and surface properties such as appearance and scratch resistance and, moreover, materials of balanced impact resistance and rigidity starting from inexpensive styrenic resins.

On the other hand, a process for melt-blending two kinds or more of resins after completion of polymerization by means of an extruder is known for the preparation of rubber-modified styrenic resin compositions as disclosed in the examples of Japan Kokai Tokkyo Koho Sho 63-221,147 (1988) and Japan Kokai Tokkyo Koho Hei 6-157,863 (1994).

However, this process requires an increased number of manufacturing steps and is not necessarily desirable from the standpoint of production cost.

In particular, Japan Kokai Tokkyo Koho Hei 6-157,863 (1994) gives examples in which special procedures such as the following are described for the blending of rubber-reinforced styrenic resins and rubber-reinforced methacrylate-styrene copolymers: ① blending of the reaction mixtures after completion of polymerization in the manufacturing step; ② kneading of the molten resins emerging from the recovery step; and ③ adding molten resins of one kind through an extruder or the like to resins of another kind while in the manufacturing step. Any of these procedures, however, is concerned with the blending of different resins after completion of polymerization and it is difficult to control the structure of matrix resins. In view of the existing state of things, the present inventors have conducted intensive studies, found that the aforementioned problems can be solved by continuing the polymerization while allowing an aromatic vinyl monomer and a (meth) acrylate monomer to coexist in the polymerization system under a specified condition in the manufacturing step of rubber-modified aromatic vinyl resins, and completed this invention.

Accordingly, an object of this invention is to provide a process for preparing rubber-modified styrenic resin compositions easily and economically with good processability and surface properties such as appearance and scratch resistance and, furthermore, with a good balance between impact resistance and rigidity.

DISCLOSURE OF THE INVENTION

This invention thus relates to a process for preparing rubber-modified aromatic vinyl resin compositions which comprises polymerizing a raw material solution containing 3 to 20% by weight of rubbery polymer, 50 to 97% by weight of an aromatic vinyl monomer, and 0 to 30% by weight of a solvent until the conversion of said aromatic vinyl monomer falls in the range from 30 to 70%, adding to the reaction mixture a (meth)acrylate monomer or a mixture of monomers containing a (meth)acrylate monomer so that the ratio by weight of the aromatic vinyl monomer in the reaction mixture to the (meth)acrylate monomer becomes 85/15 to 50/50, continuing the polymerization, and devolatilizing the unreacted monomers, solvent and the like.

This invention also relates to a process for preparing rubber-modified aromatic vinyl resin compositions composed of (A) rubber-modified aromatic vinyl resins containing rubbery polymer as dispersed particles and (B) aromatic vinyl resins containing styrenic units and (meth)acrylate units which comprises four steps made up of the first step wherein a raw material solution containing 3 to 20% by weight of rubbery polymer, 50 to 97% by weight of an aromatic vinyl monomer, and 0 to 30% by weight of a solvent is polymerized until the conversion of said aromatic vinyl monomer falls in the range from 30 to 70%, the second step wherein a (meth)acrylate monomer or a mixture of monomers containing a (meth)acrylate is added to the reaction mixture of said first step so that the ratio by weight of the aromatic vinyl monomer in the reaction mixture to the (meth)acrylate monomer becomes 85/15 to 50/50, the third step wherein the polymerization is continued until the conversion of the monomers in the reaction mixture attains 70% or more, and the fourth step wherein the reaction mixture of the aforementioned third step is devolatilized to remove the unreacted monomers, solvent and the like.

This invention will be described in detail below.

In the first step in the preparation of rubber-modified aromatic vinyl resin compositions of this invention, a raw material solution containing rubbery polymer, an aromatic vinyl monomer and a solvent at a specified ratio is allowed to polymerize until the conversion of the aromatic vinyl monomer falls in the range from 30 to 70%.

Aromatic vinyl monomers useful here are, for example, styrene, α-methylstyrene and p-methylstyrene, and styrene is used advantageously because of its low price. These aromatic vinyl monomers may be used singly or as a mixture of two or more.

The proportion of the aromatic vinyl monomer in the raw material solution in the first step is normally 50 to 97% by weight, preferably 57 to 95% by weight. A proportion of less than 50% by weight deteriorates the rigidity and heat resistance while a proportion in excess of 97% by weight deteriorates the impact resistance.

Any polymer which shows rubbery properties at normal temperature is useful as rubbery polymer and examples of such polymer are polybutadiene, styrene-butadiene copolymers, styrene-butadiene block copolymers, hydrogenated (partially hydrogenated) polybutadiene, hydrogenated (partially hydrogenated) styrene-butadiene copolymers, hydrogenated (partially hydrogenated) styrene-butadiene block copolymers, ethylene -propylene copolymers, ethylene-propylene-unconjugated diene terpolymers, isoprene polymers, and styrene-isoprene copolymers.

The proportion of the rubbery polymer in the raw material solution in the first step is normally 3 to 20% by weight, preferably 4 to 13% by weight. A proportion of less than 3% deteriorates the impact resistance because of a low- rubber content in the resin compositions while a proportion in excess of 20% by weight increases the viscosity of the raw material solution with the resultant difficulty in transport.

There is no specific restriction to the solution viscosity of rubbery polymer, but rubbery polymer whose viscosity as 5% by weight solution in styrene at 25 ° C. is in the range from 20 to 100 cps, preferably 25 to 85 cps, is desirable. Any deviation from this range may cause difficulties in the control of the particle diameter of the rubber to be dispersed in the resin.

It is allowable to add normally 30% by weight or less, preferably 25% by weight or less, of a solvent such as ethylbenzene, toluene and methyl ethyl ketone to the raw material solution to be used in the first step. It is also allowable as needed to add normally 0.2% by weight or less, preferably 0.1% by weight or less, of a polymerization initiator in order to improve the impact resistance. The polymerization initiator may be added only to the first step or to the first and second steps.

In the first step, the raw material solution is allowed to polymerize until the conversion of the aromatic vinyl monomer falls in the range from 30 to 70% by weight, preferably 35 to 60% by weight, in order to satisfy the balance in properties between scratch resistance and impact resistance. The required impact resistance is not obtained when the conversion of the aromatic vinyl monomer is less than 30% nor the required scratch resistance is obtained when the monomer is allowed to polymerize until the conversion exceeds 70%.

There is no specific restriction to the procedure for polymerizing the raw material solution until the conversion of the aromatic vinyl monomer falls in the range from 30 to 70% in the first step and any procedure commonly known for the preparation of rubber-modified polystyrene may be used. Generally, the raw material solution is fed to a stirred reactor and allowed to polymerize at 100 to 170° C., either continuously or batchwise.

In the process of this invention, the raw material solution is allowed to polymerize until the conversion of the aromatic vinyl monomer attains a range from 30 to 70% in the aforementioned first step, and in the second step which follows, the (meth)acrylate monomer or a mixture of monomers containing the (meth)acrylate monomer is added, together with an additional quantity of the solvent as needed, to the reaction mixture so that the ratio by weight of the aromatic vinyl monomer in the reaction mixture to the (meth)acrylate monomer becomes 85/15 to 50/50, preferably 80/20 to 55/45. The scratch resistance deteriorates when the aforementioned ratio by weight of the aromatic vinyl monomer to the (meth)acrylate monomer becomes greater than 85/15 and the impact resistance diminishes markedly when the ratio becomes smaller than 50/50.

Those (meth)acrylate monomers which are useful here include methyl methacrylate, ethyl methacrylate, butyl methacrylate, ethyl acrylate and butyl acrylate. In particular, methyl methacrylate and methyl acrylate are used advantageoulsy because they can be polymerized under control and they are effective for improving the scratch resistance and rigidity. They may be used singly or as a mixture of two or more.

The aforementioned addition of the (meth)acrylate monomer or a mixture of monomers containing the (meth)acrylate monomer to the reaction mixture may be made by adding only the (meth)acrylate monomer or by adding the (meth) acrylate monomer together with the aromatic vinyl monomer. A solvent such as the aforementioned ethylbenzene may be further added at the same time as needed.

The procedure for adding the (meth)acrylate monomer to the reaction mixture is not restricted to a specific one as long as it can effect the addition while the conversion of the aromatic vinyl monomer in the raw material solution remains somewhere in the range from 30 to 70%. Where the polymerization is carried out batchwise, the (meth)acrylate monomer is added directly to the reactor. In the case of continuous polymerization, the monomer in question may be added to an addition port provided in the transfer line between plural reactors or added directly to the reactor.

According to the process of this invention, the (meth) acrylate monomer is added to the reaction mixture so that the ratio by weight of the aromatic vinyl monomer in the reaction mixture to the (meth)acrylate monomer becomes 85/15 to 50/50 in the second step, and in the third step which follows the polymerization is continued until the conversion of the monomers in the reaction mixture exceeds 60%, preferably 70%. Conversion of less than 60% here reduces the quantity of aromatic vinyl-(meth)acrylate copolymers to be produced in the third step and becomes less effective for improving the scratch resistance.

According to the process of this invention, aromatic vinyl polymers are formed until the addition of the (meth)acrylate monomer or a mixture of monomers containing the (meth) acrylate monomer is made and aromatic vinyl-(meth) acrylate copolymers are formed after the addition. It is desirable that the ratio of the aromatic vinyl-(meth)acrylate copolymers to the aromatic vinyl polymers becomes 45/100 or more, preferably 60/100 or more. A ratio of less than 45/100 causes a marked loss in the effectiveness for improving the scratch resistance.

Upon completion of the polymerization in the presence of the (meth)acrylate monomer as described above, the reaction mixture is devolatilized in the usual manner to remove volatile components such as the unreacted monomers and solvent to obtain the object rubber-modified aromatic vinyl resin compositions.

Rubber-modified aromatic vinyl resin compositions to be prepared by the process of this invention are characterized by that the continuous phase of the rubber-modified aromatic vinyl resins is a semi-compatible dispersion of the aromatic vinyl polymers and the aromatic vinyl-(meth) acrylate copolymers. The compatible state of the two phases here can be learned readily by a known method, for example, by selectively dyeing the specimen in two steps with the use of osmium oxide and ruthenium oxide and observing the dyed specimen under a transmission electron microscope [refer to J. S. Trent, J. I. Scheinbeim and P. R. Couchman, Macromolecules, 16, 589 (1983)].

The average interfacial length between the aromatic vinyl polymer phase and the aromatic vinyl-(meth)acrylate copolymer phase in rubber-modified aromatic vinyl resin compositions of this invention is preferably 2.5 $\mu$m or more, more preferably 3.0 $\mu$m or more, per 1 square $\mu$m when the 10,000-magnification electron micrograph is examined. The two phases are not sufficiently compatible and the impact resistance deteriorates markedly when the interfacial length is less than 2.5 $\mu$m.

Moreover, in rubber-modified aromatic vinyl resin compositions of this invention, the average diameter of rubber particles dispersed in the rubber-modified vinyl aromatic resin component is preferably in the range from 0.4 to 1.5 $\mu$m, more preferably from 0.4 to 0.9 $\mu$m. An average particle diameter of less than 0.4 $\mu$m leads to insufficient impact resistance while one in excess of 1.5 $\mu$m markedly deteriorates the appearance such as gloss.

The average particle diameter here is obtained as follows: the resin in question is dyed with osmium tetroxide, an ultrathin section of the dyed resin is photographed by an electron microscope at 10,000 magnifications, 1,000 or more dispersed rubber particles in the electron micrograph are measured for their diameter, and the average particle diameter is calculated by the following equation;

$$\text{Average particle diameter} = \Sigma n_i D_i^4 / \Sigma n_i D_i^3$$

wherein n i is the number of rubber particles with the particle diameter D i.

Rubber-modified aromatic vinyl resin compositions to be prepared by the process of this invention show a still further improved balance of impact resistance, rigidity and appearance when silicone oil with a surface tension of 19.0 to 22.0 dyne/cm at 25° C. is incorporated into the compositions in the range from 0.005 to 0.5% by weight. Organopolysiloxanes useful for this purpose show a surface tension in the range from 19.0 to 22.0 dyne/cm, preferably 19.8 to 21.5 dyne/cm, at 25° C. In such a case, organopolysiloxanes disperse optimally in the resin and produce a marked effect for improving the impact resistance.

There is no specific restriction to organopolysiloxanes useful for the process of this invention and polymers showing a viscosity of 10 to 1,000 centistokes at 25° C. and containing a repeating unit represented by the following general formula can be used:

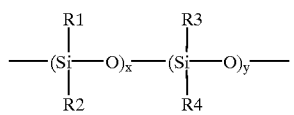

wherein R1,R2, R3 and R4 are organic groups such as alkyl, phenyl and aralkyl.

Examples of such organopolysiloxanes are dimethylpolysiloxane, methylphenylpolysiloxane, and methylethylpolysiloxane. These organopolysiloxanes may be used singly or as a mixture of two or more.

In the preparation of rubber-modified aromatic vinyl resin compositions of this invention, the aforementioned organopolysiloxanes may be added at an arbitrary stage in the manufacturing process. For example, they may be added to the raw material prior to polymerization, to the solution somewhere in the course of polymerization, or to the granulating step after completion of polymerization. Moreover, organopolysiloxanes may be mixed with styrenic resins or rubber-modified styrenic resins to form master pellets of high organopolysiloxane concentration and such master pellets may be aded to rubber-modified styrenic resin compositions of this invention with the aid of a kneader or a molding machine.

Rubber-modified styrenic resin compositions of this invention can be used as they are in the fields where HIPS and ABS are applied in large quantities. If necessary, the compositions may also be used together with the following additives which find extensive use in HIPS; antioxidants, heat stabilizers, light stabilizers, fire retardants, nonionic surfactants, anionic surfactants, and lubricants such as liquid paraffin, higher fatty acids and their metal salts, ethylenebis (fatty acid)amides, and dibutyl and dioctyl esters of adipic and sebacic acids.

PREFERRED EMBODIMENTS OF THE INVENTION

This invention will be described in detail below with reference to the accompanying examples and comparative examples, but it will not be restricted at all by them. The methods of testing various properties adopted in the examples and comparative examples are described below.

① Rubber content
The rubber content was determined by the Wijs method.
② Particle diameter of rubber
The average particle diameter was determined by dyeing the resin with osmium tetroxide, preparing an ultrathin section of the dyed resin, photographing the section by an electron microscope at 10,000 magnifications, measuring the diameter of 1,000 or more dispersed rubber particles in the electron micrograph, and processing the data by application of the following equation;

$$\text{Average particle diameter} = \Sigma n_i D_i^4 / \Sigma n_i D_i^3$$

wherein n i is the number of rubber particles with the particle diameter D i.
③ Izod impact strength
The Izod impact strength was determined in accordance with JIS K6871 (notched).
④ Flexural modulus
The flexural modulus was determined in accordance with ASTM D-790.
⑤ Gloss
The gloss was determined in accordance with JIS K7105.
⑥ Pencil hardness
The pencil hardness was determined in accordance with JIS K5400.

EXAMPLE 1

A raw material solution was prepared by dissolving 15.6 parts by weight of ethylbenzene and 0.015 part by weight of ditertiarybutylperoxycyclohexane in 100 parts by weight of a solution containing 88.5% by weight of styrene and 11.5% by weight of polybutadiene rubber of low cis content.

The raw material solution was fed continuously at a constant rate to the first reactor which is a tank of complete mixing type and allowed to polymerize and thereafter the whole contents were continuously fed to the second reactor which is a tower of plug flow type and allowed to polymerize.

The conversion of the styrene at the outlet of the second reactor was 44.8% and to this reaction mixture was added continuously methyl methacrylate so that the ratio by weight of the styrene to the methyl methacrylate became 72.5/27.5. The resulting mixture in its entirety was continuously fed to the third reactor which is a static mixer of plug flow type and allowed to polymerize further.

The polymeric liquid was devolatilized under reduced pressure to remove volatiles, mixed with 1 part by weight of liquid paraffin and 0.1 part by weight of dimethylsilicone oil and pelletized.

The rubber content, average particle diameter of rubber, Izod impact strength, flexural modulus, gloss and pencil hardness of the resin thus prepared are shown in Table 1.

EXAMPLE 2

A raw material solution was prepared by dissolving 16.5 parts by weight of ethylbenzene and 0.015 part by weight of ditertiarybutylperoxycyclohexane in 100 parts by weight of a solution containing 93.5% by weight of styrene and 6.5% by weight of polybutadiene rubber of low cis content.

The raw material solution was fed continuously at a constant rate to the first reactor which is a tank of complete mixing type and allowed to polymerize and thereafter the whole contents were continuously fed to the second reactor which is a tower of plug flow type and allowed to polymerize.

The conversion of the styrene at the outlet of the second reactor was 35.0% and to this reaction mixture was added continuously methyl methacrylate so that the ratio by weight of the styrene to the methyl methacrylate became 75.3/24.7. The resulting mixture in its entirety was continuously fed to the third reactor which is a static mixer of plug flow type and allowed to polymerize further.

The polymeric liquid was devolatilized under reduced pressure to remove volatiles, mixed with 1 part by weight of liquid paraffin and 0.1 part by weight of dimethylsilicone oil and pelletized.

The rubber content, average particle diameter of rubber, Izod impact strength, flexural modulus, gloss and pencil hardness of the resin thus prepared are shown in Table 1.

Comparative Example 1

The same procedure as in the aforementioned Example 1 was followed to prepare resin pellets with the exception of polymerizing the styrene to the conversion of 23.5% at the outlet of the second reactor and adding methyl methacrylate continuously to the reaction mixture so that the ratio by weight of the styrene to the methyl methacrylate becomes 79.1/20.9.

The rubber content, average particle diameter of rubber, Izod impact strength, flexural modulus, gloss and pencil hardness of the resin thus prepared are shown in Table 1.

Comparative Example 2

The same procedure as in the aforementioned Example 1 was followed to prepare resin pellets with the exception of polymerizing the styrene to the conversion of 39.5% at the outlet of the second reactor and adding methyl methacrylate continuously to the reaction mixture so that the ratio by weight of the styrene to the methyl methacrylate becomes 89.2/10.8.

The rubber content, average particle diameter of rubber, Izod impact strength, flexural modulus, gloss and pencil hardness of the resin thus prepared are shown in Table 1.

Comparative Example 3

The same procedure as in the aforementioned Example 1 was followed to prepare resin pellets with the exception of polymerizing the styrene to the conversion of 59.0% at the outlet of the second reactor and adding methyl methacrylate continuously to the reaction mixture so that the ratio by weight of the styrene to the methyl methacrylate becomes 42.5/57.5.

The rubber content, average particle diameter of rubber, Izod impact strength, flexural modulus, gloss and pencil hardness of the resin thus prepared are shown in Table 1.

TABLE 1

|  | Example | | Comparative example | | |
|---|---|---|---|---|---|
|  | 1 | 2 | 1 | 2 | 3 |
| Rubbery polymer*[1] (wt %) | 11.5 | 6.5 | 11.5 | 11.5 | 11.5 |
| Styrene monomer (wt %) | 88.5 | 93.5 | 88.5 | 88.5 | 88.5 |
| Ethylbenzene (part by wt) | 15.6 | 16.5 | 15.6 | 15.6 | 15.6 |
| Conversion of styrene (%) | 44.8 | 35.0 | 23.5 | 39.5 | 59.0 |
| Styrene/methyl methacrylate (ratio by wt) | 72.5/27.5 | 75.3/24.7 | 79.1/20.9 | 89.2/10.8 | 42.5/57.5 |
| Rubber content (wt %) | 13.0 | 7.7 | 13.0 | 13.5 | 12.5 |
| Average particle diameter of rubber (μm) | 0.60 | 0.68 | 0.65 | 0.57 | 0.72 |

TABLE 1-continued

|  | Example | | Comparative example | | |
|---|---|---|---|---|---|
|  | 1 | 2 | 1 | 2 | 3 |
| Izod impact strength (kg.cm/cm) | 15.0 | 10.5 | 8.5 | 12.5 | 7.0 |
| Flexural modulus (kg/mm) | 210 | 250 | 205 | 208 | 195 |
| Gloss | 100 | 101 | 98 | 100.5 | 95 |
| Pencil hardness | HB | F | B | 3B | B |

(Note)
*1: Polybutadiene rubber of low cis content

Industrial Applicability

According to this invention, it is possible to prepare easily and economically rubber-modified aromatic vinyl resin compositions with excellent surface properties in respect to appearance and scratch resistance and good balance between impact resistance and rigidity.

Rubber-modified aromatic vinyl resin compositions prepared by this invention are scratch-resistant materials even in the absence of coating and are used advantageously as injection molding materials in the fields of electric appliances, electronic equipment, office automation equipment and communication equipment.

What is claimed is:

1. A process for preparing a rubber-modified aromatic vinyl resin composition which comprises polymerizing a raw material solution consisting essentially of 3 to 20% by weight of rubbery polymer, 50 to 97% by weight of an aromatic vinyl monomer, and 0 to 30by weight of a solvent, and, optionally, a polymerization initiator, until the conversion of said aromatic vinyl monomer falls in the range from 30 to 70%, adding to the reaction mixture a (meth)acrylate monomer becomes 85/15 to 50/50, continuing the polymerization, and devolatilizing to remove unreacted monomers and solvent.

2. A process for preparing a rubber-modified aromatic vinyl resin composition composed of (A) a rubber-modified aromatic vinyl resin containing rubbery polymer as dispersed particles and (B) an aromatic vinyl resin containing styrenic units and (meth)acrylate units, which process comprises four steps consisting of a first step wherein a raw material solution consisting essentially of 3 to 20% by weight of rubbery polymer, 50 to 97% by weight of an aromatic vinyl monomer, and 0 to 30% by weight of a solvent, and, optionally, a polymerization initiator, is polymerized until the conversion of said aromatic vinyl monomer falls in the range from 30 to 70%, a second step wherein a (meth)acrylate monomer or its mixture with other monomers is added to the reaction mixture of the aforementioned first step so that the ratio by weight of the aromatic vinyl monomer in the reaction mixture to the (meth)acrylate monomer becomes 85/15 to 50/50, a third step wherein the reaction mixture in the aforementioned second step is subjected to continued polymerization until the conversion of the monomers in the reaction mixture reaches 70% or more, and a fourth step wherein the reaction mixture of the aforementioned third step is devolatilized to remove unreacted monomers and solvent.

3. The process of claim 1, wherein a polymerization initiator is present in said raw material solution.

4. The process of claim 2, wherein a polymerization initiator is present in said raw material solution.

5. The process of claim 3, wherein sid polymerization initiator is present in said raw material solution in an amount of 0.2% by weight or less.

6. The process of claim 4, wherein said polymerization initiator is present in said raw material solution in an amount of 0.2% by weight or less.

7. The process of claim 3, wherein said polymerization initiator is also added to said reaction mixture in said steo of adding to the reaction mixture a (meth)acrylate monomer or its mixture with other monomers.

8. The process of claim 4, wherein said polymerization initiator is also added to said reaction mixture in said second step.

* * * * *